G. MURRAY, Jr. & J. J. MURRAY.
FLUID-COOLER.
No. 174,556. Patented March 7, 1876.
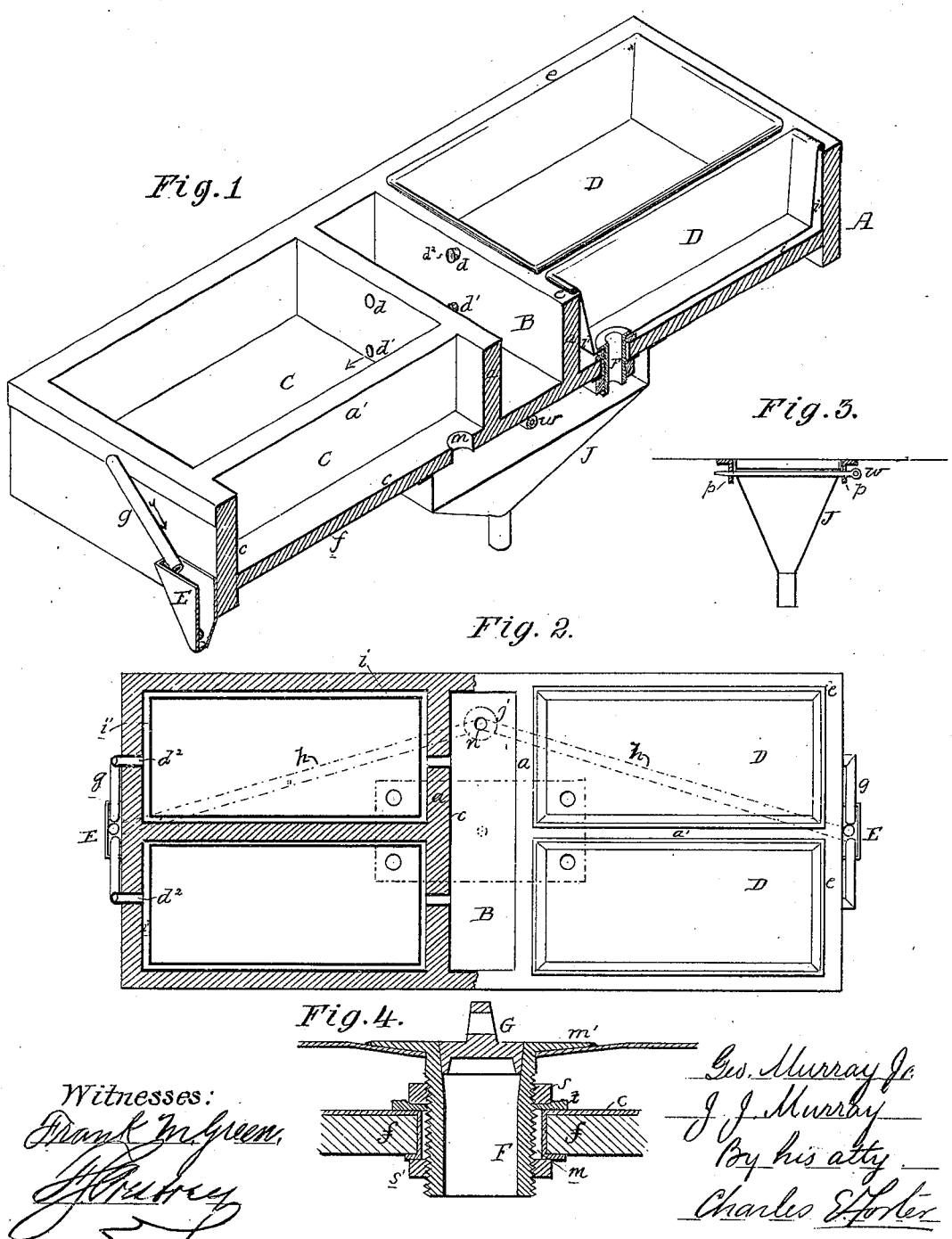

UNITED STATES PATENT OFFICE.

GEORGE MURRAY, JR., AND JOHN J. MURRAY, OF HOMER, NEW YORK.

IMPROVEMENT IN FLUID-COOLERS.

Specification forming part of Letters Patent No. 174,556, dated March 7, 1876; application filed January 29, 1876.

*To all whom it may concern:*

Be it known that we, GEORGE MURRAY, Jr., and JOHN J. MURRAY, of Homer, county of Cortland, State of New York, have invented certain Improvements in Apparatus for Cooling Fluids, of which the following is a specification:

The object of our invention is to cool milk and other fluids with rapidity by means of an inexpensive apparatus, easily manipulated, and readily maintained in that thoroughly clean condition essential to its efficiency.

In the accompanying drawing, Figure 1 is a sectional perspective view of our improved milk-cooler; Fig. 2, a plan view, partly in section; Fig. 3, a detached view; and Fig. 4, a detached sectional view, drawn to an enlarged scale.

A is an oblong box, divided by transverse partitions $a\ a$, to form a central transverse compartment, B, and by longitudinal partitions $a'\ a'$, to form, at each side of the compartment B, a series of compartments, C C—two on each side being shown in the present instance. All the inside faces of the body of the box are covered by a sheathing, $c$, of sheet zinc, tin, or other suitable metal or enamel. To each compartment C is adapted an oblong pan, D, having at the upper edge a flange, $e$, which, bearing upon the edges of the box and its partitions, maintains the pan free from contact with the bottom of the box, leaving a shallow space, $i$, and all the sides of the pan are inclined, so as to leave between the same and the adjacent sides of the compartment C narrow spaces $i'$. In the partitions $a\ a$, opposite each compartment C, are two openings, $d$ $d^1$, one above the other, and in the ends of the box, opposite each opening $d$, is an opening, $d^2$, which communicates with a pipe, $g$. The pipes $g$ at each end of the box lead to a cup, E, and both the latter communicate, through pipes $h$, (shown in dotted lines, Fig. 2,) with a funnel, $j$, directly below the discharge-opening $n$ of the compartment B in the bottom $f$ of the box. In the bottom of the box, near the inner end of each compartment C, is an opening, $m$, through which extends the discharge-pipe of the pan above. Each discharge-pipe consists of a metal tube, F, having at the top a thin annular flange, $m'$, which is soldered to the bottom of the pan. The tube has a perfectly smooth bore, enlarged near the top to receive a taper plug, G, and is threaded externally to receive two nuts, $s\ s'$, between which is clamped the bottom $f$ of the box, a washer, $t$, of leather or other suitable material, intervening between the bottom of the box and nut $s$, and effectually sealing the opening $m$. A funnel-like casing, J, Figs. 1 and 3, is suspended by a detachable cross-bar, $w$, to brackets $p\ p$ on the bottom of the box, and is of such a size as to receive the lower ends of all the discharge-pipes, for a purpose described hereafter.

The pans are applied to the box by first adjusting the nuts $s$, placing the washers $t$ upon the tubes F below said nuts, adjusting the pans to their positions, with the tubes F extending through the openings $m$, and then applying the nuts $s'$, to secure the pans and bring the nuts $s$ firmly on the washers, clamping the latter between the nuts and the bottom of the box.

The milk or other fluid to be cooled is placed in the pans D, and the compartment or chest B is filled with ice and water, or other congealing fluid or mixture, which passes through the openings $d\ d^1$ into the compartments C, through the channels $i\ i'$ beneath, and on all sides of the pans to the outlets $d^2$. The outlets $d^2$ prevent the water from rising above the top of the box and conduct it to the pipes $g$, from which it flows to the cups E, and through the pipes $h$ to the funnel $j$, the latter also receiving the water discharged from the chest B through the opening $n$. In its passage round the pans the water absorbs the heat from the latter and their contents, rapidly cooling the same.

Any one or all of the pans may be quickly emptied by removing the plug or plugs G, the fluid flowing into the funnel J from all the pans, and being discharged through the single outlet-tube of the funnel into any suitable receptacle without disturbing the pans, and without drawing off the water or loosening the packed joints.

The operations with any one or more of the pans may be discontinued at any time by inserting stoppers or plugs $d^2$ in the openings $d$ $d^1$, opposite said pan or pans.

Every facility is afforded by the above construction for maintaining all the parts in that perfectly clean condition indispensable when milk is treated, inasmuch as there are no cracks or recesses for retaining particles of milk, where it would sour, the bore of the outlet-pipe F being perfectly smooth, no corners being presented where the pipe is secured to the pan, and no packing material being in contact with the milk.

As all exposed portions of the box are covered by the metal sheathing or enamel, the wood-work is effectually prevented from absorbing any part of the fluid.

It will also be seen that while the pans may be readily detached for the purpose of cleaning them on the outside, and of cleaning the compartments C, they may be as readily replaced, and the opening $m$ so effectually sealed as to prevent any leakage. By withdrawing the bar $w$, the funnel J may be detached to obtain access to the nuts $s$, or for cleaning.

By arranging the ice-chest B between the two series of compartments C, the apparatus is rendered more compact, and the cooling effect of the ice at both sides of the chest is utilized.

It will be seen that three or more compartments, C, may be arranged at each side of the chest, and that, owing to the simplicity of its construction, the apparatus may be manufactured at any place where the services of a carpenter and tinman can be obtained.

We claim—

1. The combination of the ice-chest B and two series of separate and independent compartments on the same plane with and at opposite sides of the chest, each having an independent communication with the chest, and adapted to receive a pan, B, as set forth.

2. The combination of the box A, its compartments and pans D, and the tubes and channels leading from the openings $d^2$ to a funnel, $j$, below the opening $n$.

3. The detachable funnel-casing J, combined with the box A, its water-compartments C, and with a series of discharge-tubes, F, extending from the pans D through the sealed water-compartments, and each discharging into said funnel, substantially as set forth.

4. The combination of the ice-chest B, two series of compartments, C, arranged on opposite sides of the chest, and communicating therewith through openings $d$ $d^1$, provided with stoppers $d^3$, substantially as set forth.

In testimony whereof we have signed our names to this specification in the presence of two subscribing witnesses.

GEORGE MURRAY, JR.
JOHN J. MURRAY.

Witnesses:
JOHN H. HICOK,
S. McC. BARBER.